United States Patent
Hinterberger et al.

(10) Patent No.: US 10,637,036 B2
(45) Date of Patent: Apr. 28, 2020

(54) METHOD FOR MANUFACTURING A BATTERY, BATTERY, AND MOTOR VEHICLE

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 179 days.

(21) Appl. No.: 15/550,534

(22) PCT Filed: Feb. 16, 2016

(86) PCT No.: PCT/EP2016/053229
§ 371 (c)(1),
(2) Date: Aug. 11, 2017

(87) PCT Pub. No.: WO2016/131806
PCT Pub. Date: Aug. 25, 2016

(65) Prior Publication Data
US 2018/0034035 A1  Feb. 1, 2018

(30) Foreign Application Priority Data
Feb. 18, 2015  (DE) .......... 10 2015 002 147

(51) Int. Cl.
*H01M 2/34* (2006.01)
*H01M 2/10* (2006.01)
(Continued)

(52) U.S. Cl.
CPC ............ *H01M 2/34* (2013.01); *B60L 3/0046* (2013.01); *B60L 3/12* (2013.01); *B60L 50/64* (2019.02);
(Continued)

(58) Field of Classification Search
CPC ....................................... H01M 2/34
See application file for complete search history.

(56) References Cited

U.S. PATENT DOCUMENTS

| 5,847,912 A | 12/1998 | Smith et al. |
| 8,587,907 B2 | 11/2013 | Gaben |

(Continued)

FOREIGN PATENT DOCUMENTS

| DE | 10 2010 045 037 A1 | 3/2011 |
| DE | 10 2011 117 474 A1 | 5/2013 |

(Continued)

OTHER PUBLICATIONS

Notification of Transmittal of Translation of the International Preliminary Report on Patentability dated Aug. 31, 2017, in connection with corresponding international application No. PCT/EP2016/053229 ( 7 pages).

(Continued)

Primary Examiner — Miriam Stagg
Assistant Examiner — Brian R Ohara
(74) Attorney, Agent, or Firm — Maier & Maier, PLLC

(57) ABSTRACT

A battery for a motor vehicle, in which electrical connections of a plurality of battery cells, are connected by at least one electrically conducting connection element. The battery cells have a galvanic element. The battery cells are connected so that a rated voltage is provided by the battery which is greater than the rated voltage of one of the battery cells. After connecting the electrical connection terminals of at least two battery cells, a switching element of one of the battery cells, arranged between an arrester of the galvanic element and one of the electrical connection terminals, is brought into a switching state in which an electrically conducting connection between an arrester of the galvanic (Continued)

element and at least one of the electrical connection terminals of the battery cell is produced.

5 Claims, 1 Drawing Sheet

(51) Int. Cl.
  *H01M 2/20* (2006.01)
  *H01M 10/42* (2006.01)
  *B60L 50/64* (2019.01)
  *B60L 58/21* (2019.01)
  *B60L 3/00* (2019.01)
  *B60L 3/12* (2006.01)

(52) U.S. Cl.
  CPC .......... *B60L 58/21* (2019.02); *H01M 2/1077* (2013.01); *H01M 2/208* (2013.01); *H01M 10/4207* (2013.01); *H01M 10/4257* (2013.01); *B60L 2240/545* (2013.01); *B60L 2240/547* (2013.01); *B60L 2240/549* (2013.01); *H01M 2010/4278* (2013.01); *H01M 2200/00* (2013.01); *H01M 2220/20* (2013.01); *Y02T 10/7005* (2013.01); *Y02T 10/7061* (2013.01)

(56) References Cited

U.S. PATENT DOCUMENTS

| | | | |
|---|---|---|---|
| 9,222,985 | B2 | 12/2015 | Kang et al. |
| 2006/0152190 | A1 | 7/2006 | Riemschneider |
| 2010/0320969 | A1* | 12/2010 | Sakakibara ......... H01M 2/1022 320/118 |
| 2012/0242144 | A1* | 9/2012 | Chorian ............... H01M 2/34 429/62 |
| 2012/0243130 | A1 | 9/2012 | Gaben |

FOREIGN PATENT DOCUMENTS

| | | |
|---|---|---|
| DE | 10 2012 206 622 A1 | 10/2013 |
| EP | 075804 A1 | 1/1997 |
| EP | 2442384 A2 | 4/2012 |
| JP | H09-294338 A | 11/1997 |
| JP | 2006-506787 A | 2/2006 |
| KR | 10-2012-0075398 A | 7/2012 |
| KR | 10-212-0095893 A | 8/2012 |

OTHER PUBLICATIONS

Office Action dated Oct. 10, 2018 in corresponding Korean Application No. 10-2017-7025222; 14 pages including English-language translation.
Examination Report dated Aug. 20, 2015 of corresponding German application No. 10 2015 002 147.8; 5 pgs.
International Search Report dated Apr. 1, 2016 of corresponding International application No. PCT/EP2016/053229; 13 pgs.
Search Report dated Sep. 6, 2018 in corresponding European Application No. 16 704 642.4; 6 pages.
Office Action dated Dec. 13, 2018 in corresponding Chinese Application No. 201680010839.0; 13 pages; Machine translation attached.

* cited by examiner

METHOD FOR MANUFACTURING A BATTERY, BATTERY, AND MOTOR VEHICLE

FIELD

The invention relates to a method for manufacturing a battery, in which electrical connection terminals of a plurality of battery cells, having a galvanic element accommodated in a battery cell housing of the respective battery cell, are connected by means of at least one electrically conducting connection element. This interconnecting is carried out so that a rated voltage is provided by the battery which is greater than the rated voltage of one of the battery cells. Furthermore, the invention relates to a battery for a motor vehicle and to a motor vehicle.

BACKGROUND

From the prior art, such as DE 10 2010 045 037 A1, it is known how to interconnect a plurality of battery cells into a battery to provide a particular voltage or a particular current. Such batteries are used at present, in particular, as traction batteries in motor vehicles such as electric vehicles or hybrid vehicles for providing electrical drive energy.

An electrical voltage normally occurs at the connection terminals or battery poles of battery cells known from the prior art. By connecting in series a plurality of individual battery cells to form an overall system or battery, voltages of more than 60 volts are achieved in the manufacture of traction batteries, for example. Batteries with a voltage of more than 60 volts are also known as high-voltage batteries and they require corresponding protection measures.

In traction batteries for electric cars or hybrid vehicles, the electrical voltage at present is as much as 200 volts to 900 volts, and energy contents of up to 100 kilowatt-hours or more can be provided by such traction batteries. In particular, the construction of high-voltage batteries which can be used as traction batteries in motor vehicles such as electric vehicles or hybrid vehicles therefore requires the utmost precaution.

Already at voltages of more than 60 volts, appropriate protection measures must be taken for workers involved in the manufacture of the battery, such as the wearing of protective clothing, gloves, a helmet with visor, and the providing of coverings, and the like. Furthermore, an enormous expense is required in regard to the qualification and training in how to handle high-voltage batteries. Thus, at present there is a very large cost involved in making sure that no electrical dangers to persons are created when handling high-voltage batteries, especially during the manufacture of such a battery.

It is seen as being a drawback in this case that higher electrical voltages, such as voltages of >60 volts, may in the worst case be life-threatening. Furthermore, an enormous amount of energy may be released abruptly from high-voltage batteries. Electric arcs and short circuits may occur, injuring or killing people. Moreover, objects located near the battery may be damaged or involved in the accident.

It must be taken into account that electrical voltages cannot be recognized, detected, or felt in advance by the human senses. Only afterwards, for example, upon touching a component of a battery under voltage, is the presence of the electrical voltage recognized, but it is then already too late to avoid damage.

Measures for the safe construction and handling of high-voltage batteries are therefore very time-consuming and cost-intensive. Yet the danger of electric shock also exists for the persons who handle the battery after its manufacture, such as the customer service staff involved in the servicing of a battery. The same applies to a user of a motor vehicle outfitted with the battery. Moreover, first responders dealing with the battery after an accident with an electric vehicle or hybrid vehicle are also exposed to corresponding dangers from high-voltage batteries.

The manufacture of high-voltage batteries normally makes use of battery cells that are already active when the battery cell is delivered. Namely, as a rule, the battery cells are already precharged by the manufacturer, even though the state of charge is relatively low and may amount to around 10 percent to 15 percent of the maximum state of charge. Consequently, an electrical voltage is also already present at the two connection terminals or battery poles of the particular battery cell during the manufacture of the battery. Thus, when assembling high-voltage batteries one must expect more or less "live battery cells". Even with the low state of charge, therefore, life-threatening high voltages may occur on account of the placement of the battery cells in a series connection.

SUMMARY OF THE DISCLOSURE

The object of the present invention is therefore to create a method, a battery and a motor vehicle of the kind mentioned above, but which is accompanied by a smaller potential for danger.

In the method according to the invention, after connecting the electrical connection terminals of at least two battery cells, at least one switching element of one of the battery cells is brought into a switching state in which an electrically conducting connection between an arrester of the galvanic element and at least one of the electrical connection terminals of the battery cell is produced. The at least one switching element is arranged between the arrester and the at least one electrical connection terminal of the battery cell.

Before being brought into the switching state in which the electrically conducting connection is produced, the electrically conducting connection is accordingly interrupted. Consequently, as of yet no voltage exists on the connection terminals of the battery comprising the at least two battery cells. Thus, in particular, the occurrence of voltages over 60 volts can be prevented. Accordingly, one may handle the individual battery cells without danger during the manufacturing. Only when the individual battery cells have been connected to each other in an electrically conducting manner does the battery provide the rated voltage by way of closing the at least one switching element.

This rated voltage is preferably a voltage of more than 60 volts and in particular a voltage such as is provided for traction batteries of motor vehicles, i.e., in particular voltages between 200 volts and 900 volts.

The galvanic element of the particular battery cell is preferably designed as a secondary element, which can be discharged to energize an electrical component and be recharged after the discharging. The galvanic element constitutes, in known manner, the arrester, for example in the form of metal foils which are coated with the electrochemically active material of the electrodes of the galvanic element. Moreover, an electrolyte is provided, as well as a separator which keeps apart the electrochemically active materials. In such a galvanic element, the arresters may be stacked, folded, or wound so that the galvanic element is also called a cell stack or cell winding.

The possibility exists of bringing the at least one switching element into the switching state in which the electrically conducting connection between the arrester and the at least one electrical connection terminal of the battery cell is interrupted. Thus, the battery can be deactivated or switched to a harmless state when necessary. Accordingly, the danger is reduced and preferably eliminated when the battery, especially the high-voltage battery, is being assembled. In the present case, one should understand a high-voltage battery to mean a battery having a rated voltage of more than 60 volts.

Thus, in particular, the method makes possible a danger-free assembling of high-voltage batteries. Furthermore, if a problem occurs with the battery, the at least one switching element can be brought into the switching state in which the electrically conducting connection is interrupted. This is advantageous both during the manufacture of the battery, but also when the battery has already been installed in a motor vehicle, for example. Namely, the high-voltage battery can be deactivated in this way in an emergency, such as after an accident involving the motor vehicle.

Preferably, the at least two battery cells are connected in series by the closing of the at least one switching element. Namely, a correspondingly high voltage can then be provided with the battery, yet there is still no danger from this high voltage before the closing of the switching element.

It is possible to design the switching element as a relay. An especially safe galvanic isolation can then be achieved during the manufacture of the battery. However, such a mechanically operating component requires a relatively large space inside the battery cell.

Therefore, it is preferable to design the at least one switching element as a semiconductor component. Such a semiconductor component can be converted especially easily and quickly to the desired switching state. Advantageously, the energy demand required by a control unit that imposes a control voltage on the semiconductor component is extremely small. Furthermore, a combination of a relay with a semiconductor component can be provided in order to make or break the electrically conducting connection especially quickly and also especially safely.

In particular, when providing the semiconductor component as the switching element, it is advantageous for a control unit of the battery cell having the at least one switching element to actuate the switching element. The control unit then ensures the converting of the switching element to the switching state in which the electrically conducting connection is produced. The providing of the control unit integrated in the battery cell makes the closing of the switching element and thus the activating of the battery, i.e., the providing of the desired voltage on the terminals or connection terminals of the battery, especially easy and low-cost.

By providing the control unit by which the switching element can be brought into the closed switching state by actuating the switching element, an intelligent battery cell is provided, i.e., a so-called "SmartCell". Namely, with the control unit it is possible to assign especially easily the criteria that, when fulfilled, switch the at least one switching element so that the electrically conducting connection is produced. Thus, with the help of intelligence it is possible to program or assign an exact switching of the switching element, taking into account a plurality of parameters of the particular battery cell. This is especially the case when the control unit receives measurement values from sensors, comprising parameters affecting the battery cell such as a current intensity of a current flowing through the battery cell and/or a temperature and/or a voltage and/or a pressure and/or a mechanical stress and/or a quality of an electrolyte of the galvanic element and/or an acceleration.

Furthermore, it is especially convenient when the control unit is sent a command to actuate the switching element. This may be provided, in particular, by a wired connection and/or a wireless communication device.

The command may come, for example, from a higher-level control device of the battery, such as a battery management system. Thus, the battery management system may provide for closing the at least one switching element, for example, if it has determined that the battery cells interconnected electrically by means of the connection elements are in order. Therefore, the battery can be activated or switched as needed, without danger.

It has also been shown to be advantageous for the control unit to communicate to the higher-level control device when the switching element is brought into the switching state in which the electrically conducting connection is produced. In this case, a feedback is provided to the higher-level control device and the method is especially reliable.

The control unit may additionally or alternatively communicate to the higher-level control device the voltage that is being provided by the battery cell whose switching element has been closed. Furthermore, a multitude of other information regarding the battery cell can be communicated by the control unit to the control device. Thus, an especially efficient and intelligent operation of the battery can be assured.

It has also been shown to be advantageous to group together a plurality of battery cells to form a battery module. In this case, module connection terminals of at least two battery modules are connected by means of an electrically conductive module connector. After this, at least one switching element of one of the battery cells of the particular battery module is brought into the switching state in which the electrically conducting connection is produced. Thus, battery modules that provide a certain rated voltage after the switching elements are closed can be safely interconnected. Only after the connecting of the battery modules can it be ensured, by the closing of the switching elements, that the rated voltages of the battery modules are summed up. Thus, the overall rated voltage of the battery is provided. Thanks to such a modular design, the danger presented by the respective modules or units can be kept especially low. This is required for the safe manufacture of the battery, especially a high-voltage battery.

Furthermore, it is advantageous to close the switching element in the battery of at least the battery cell by which battery cell groupings of series-connected battery cells are interconnected in an electrically conducting manner. In this case, a certain voltage will be present on the connection terminals of the respective battery cell groupings, but this can be kept within a less critical range of, for example, less than 60 volts.

However, it is especially preferable for all battery cells of the battery to have the switching element and to close the switching elements of all battery cells at the same time after connecting the electrical connection terminals of all the battery cells. A maximum safety is then ensured, since there is no voltage on the connection terminals of any one of the battery cells of the battery before the respective switching element has been closed.

The battery according to the invention for a motor vehicle comprises a plurality of battery cells. The battery cells each comprise a battery cell housing, in which a galvanic element is accommodated. The respective battery cell furthermore has two electrical connection terminals, by which the respective battery cell is electrically connected to at least one additional battery cell of the battery by means of at least one electrically conducting connection element. The battery can provide a rated voltage which is greater than the rated voltage of one of the battery cells. A switching element is arranged between an arrester of the galvanic element and at least one of the electrical connection terminals of at least one of the battery cells, which is in a switching state in which an electrically conducting connection is interrupted between the arrester and the at least one electrical connection terminal of the battery cell. Since the switching element is open, the battery therefore does not yet provide the rated voltage which it is capable of doing when the switching element is closed. Consequently, neither is the rated voltage present on the connection terminals or connections of the battery, and the danger presented by the battery in terms of voltage is especially low.

The motor vehicle according to the invention comprises at least one battery according to the invention. The motor vehicle, for example, can be designed as a passenger car, especially an electric vehicle or hybrid vehicle. Furthermore, the motor vehicle may also be an electrically operated motorcycle or an electrically operated bicycle.

In addition, it is possible to provide the battery in a stationary energy supply system. Furthermore, it may be provided to recycle the battery, which was provided in a motor vehicle, as a so-called second-life battery, i.e., the battery is devoted to a different kind of usage. In particular, in the case of second-life applications, the requirements on the performance of the battery cells may be lower than when the battery cells are used for the battery of the motor vehicle.

The advantages and preferred embodiments described for the method according to the invention also apply to the battery according to the invention and to the motor vehicle according to the invention.

The features and combinations of features mentioned above in the description, as well as the features and combinations of features mentioned below in the description of the figures and/or shown in the figures can be used not only in the particular indicated combination, but also in other combinations or standing alone, without departing from the scope of the invention. Thus, embodiments not explicitly shown in the figures or explained, yet emerging from the explained embodiments and able to be created by separate combinations of features, are to be regarded as comprised and disclosed by the invention.

BRIEF DESCRIPTION OF THE DRAWINGS

Further benefits, features and details of the invention will emerge from the claims, the following description of preferred embodiments, and the drawings. Herein are shown:

DETAILED DESCRIPTION OF THE DRAWINGS

Figure 1:
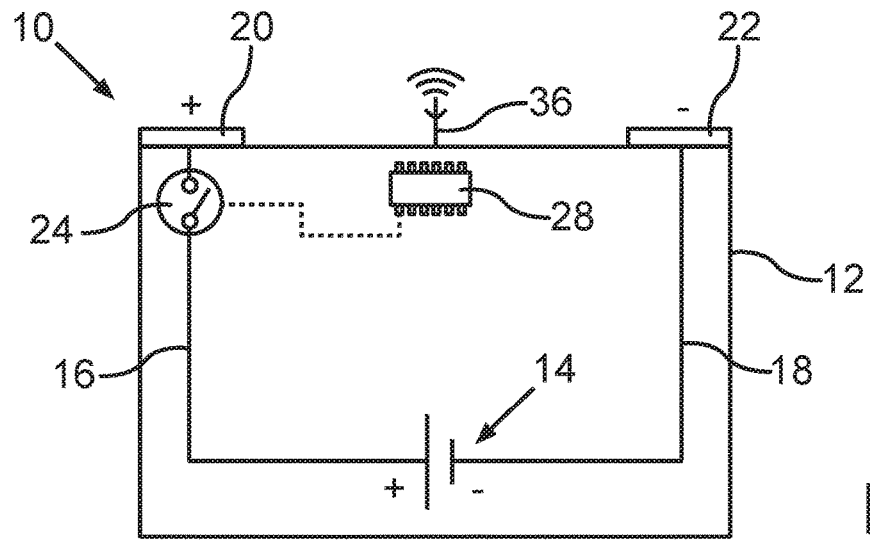
FIG. 1 a switchable battery cell, such as is used when manufacturing a battery, which is shown in FIG. 3.
Figure 3:
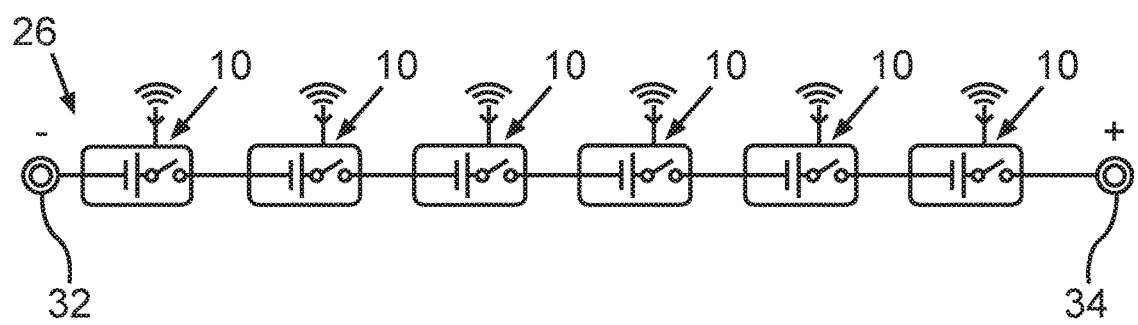
FIG. 3 schematically, the battery with a plurality of series-connected switchable battery cells according to FIG. 1.

FIG. 1 shows schematically a battery cell 10, such as may be used, for example, in a battery 26 of a motor vehicle, likewise shown schematically in FIG. 3. The battery cell 10 can be designed for this as a lithium ion cell, for example. Usually a plurality of such battery cells 10 are connected electrically in series and/or in parallel in the battery 26, such as is used, for example, as a traction battery for a motor vehicle, in order to provide correspondingly high voltages and currents.

When such battery cells 10 are connected in series, a very high voltage may be present overall, namely a voltage of several hundred volts of the battery 26, for example, because several battery modules that each contain a plurality of battery cells 10 are interconnected in electrically conducting manner. These high voltages, but also the occurrence of short circuits or electric arcs, may cause a danger to persons. Such dangers need to be avoided or reduced, for example, during the manufacture of the battery 26. This can be achieved by the battery cell 10.

The battery cell 10 comprises a battery cell housing 12, which in the present case has a prismatic shape. Inside the battery cell housing 12 is arranged a galvanic element 14, comprising arresters 16, 18 that are coated with a respective electrochemical material. In the present case, for simplicity, of the electrodes of the galvanic element 14 comprising the electrochemically active material and the arresters 16, 18, only the arrester 16 leading to a first electrical connection terminal 20 of the battery cell 10 (such as a plus pole) and the arrester 18 leading to a second electrical connection terminal 22 of the battery cell 10, i.e., the minus pole, are shown.

However, it is possible to electrically isolate the galvanic element 14 from the connection terminals 20, 22 in the battery cell 10 shown in FIG. 1. For this, a switching element 24 is provided, by means of which an electrically conducting connection can be interrupted between the arrester 16 and the connection terminal 20 by opening the switching element 24. The electrically conducting connection between the arrester 16 and the connection terminal 20 can be restored by closing the switching element 24.

In similar fashion, a second switching element (not shown) may be provided, by means of which the electrically conducting connection between the arrester 18 and the connection terminal 22 can be interrupted or restored.

The switching element 24, which can be designed for example as a semiconductor component, is switched in the present case by a control unit 28, which, like the switching element 24, is arranged inside the battery cell housing 12. Since the battery cell 10 can thus be switched by means of the switching element 24, it can be ensured that a voltage is only present on the connection terminals 20, 22 when this is desirable. This circumstance is utilized, for example, during the manufacturing of the battery 26.

Figure 2:
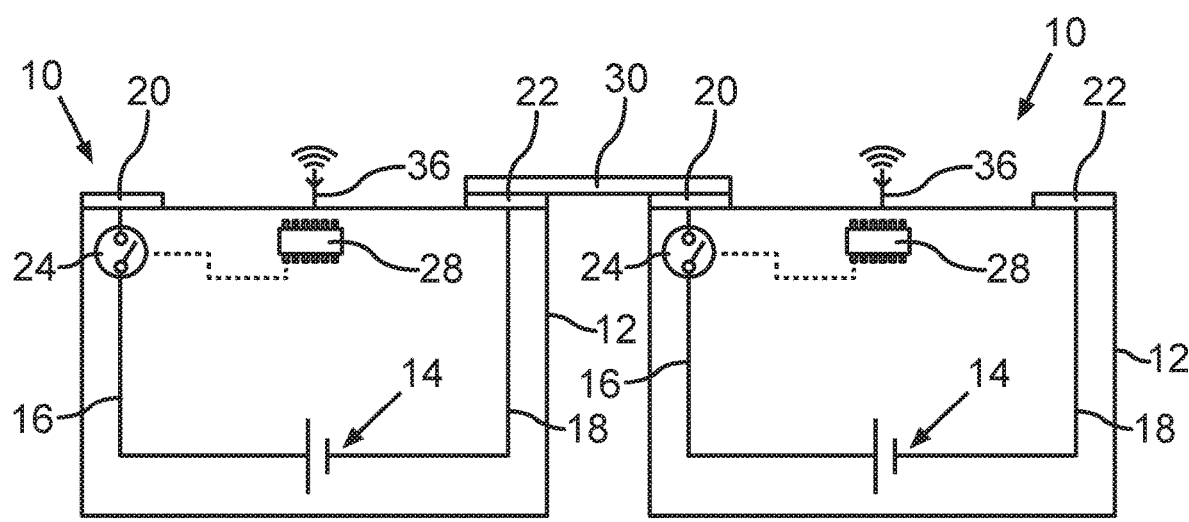
FIG. 2 schematically, two battery cells of the battery shown in FIG. 3, wherein electrical connection terminals of the two battery cells are electrically interconnected by means of a current bus bar.

The basic procedure shall be made clear by the schematic representation of FIG. 2. By means of an electrically conductive connection element, for example in the form of a current bus bar 30, the connection terminals 22, 20 of different polarity of two battery cells 10 are interconnected. In the case of battery cells 10 in which a voltage is present on the connection terminals 20, 22, the voltage of the individual battery cells 10 would add up. But in the present case the switching elements 24 ensure that a plurality of battery cells 10 may be safely connected in series by means of such current bus bars 30, without a voltage corresponding to the sum of the voltages of the individual battery cells 10 being present on the battery connection terminals 32, 34 of the battery 26 created in this manner (see FIG. 3). Thus, the battery 26 can be built safely for the most part, being designed preferably as a high-voltage battery, i.e., a battery with a rated voltage of more than 60 volts.

The switching elements 24 can be designed in particular as semiconductor components, and by applying a control voltage, the control unit 28 can ensure that the switching elements 24 are closed. Thus, the battery cells 10 can then be activated specifically when their connection terminals 20, 22 are already connected by means of the current bus bars 30 or such connection elements.

Then, by closing the switching elements 24, the activating of the battery 26 or the arming of the overall system occurs.

However, the control unit 28 is also designed to bring the switching elements 24 into a switching state in which the electrically conducting connection between the arrester 16 and the connection terminal 20 is interrupted. Thus, the battery cells 10 can be deactivated and the overall battery 26 switched to become harmless. This can be done, for example, in that the control unit 28 makes sure that control voltage is no longer present on the switching element 24, which is designed as a semiconductor component.

In order to communicate to the control unit 28 a corresponding command for switching the switching elements 24, the control unit 28 can be outfitted with, for example, a wireless communication device 36. Through this communication device 36, the control unit 28 can thus be instructed to close the switching element 24. This is carried out preferably when all battery cells 10 of the battery 26 are interconnected in electrically conducting manner.

Through the communication device 36 the control unit 28 can also be made to open the respective switching element 24. This may be advantageous, for example, during a servicing of the battery 26. Then, during servicing work, there is no longer any hazardous voltage on the battery connection terminals 32, 34, for example in the form of a negative high-voltage connection terminal and a positive high-voltage connection terminal.

The switching off of the battery 26, especially by opening all switching elements 24, is furthermore advantageous when the battery 26 is used in a motor vehicle and the motor vehicle is involved in an accident. In this case, one can make sure that the emergency responders, for example, are not exposed to the high voltage of the battery 26. Thus, by providing the control unit 28 responsive to a higher-level control device, it is possible at all times to deactivate all battery cells 10 simultaneously and thus convert the battery 26 to a safe condition.

The invention claimed is:

1. A method for manufacturing a battery, comprising:
providing electrical connection terminals of a plurality of battery cells; and
having a galvanic element taken up in a battery cell housing of the respective battery cell, and connected by at least one electrically conducting connection element in such a way that a rated voltage is provided by the battery which is greater than the rated voltage of one of the battery cells, wherein after connecting the electrical connection terminals of at least two battery cells at least one switching element of one of the battery cells, which is arranged between an arrester of the galvanic element and at least one of the electrical connection terminals of the battery cell, is brought into a switching state in which an electrically conducting connection between the arrester and the at least one electrical connection of the battery cell is produced,
wherein a control unit of the battery cell having the at least one switching element actuates the switching element to bring the switching element into the switching state in which the electrically conducting connection is produced, wherein a command is sent to the control unit, from a higher-level control device of the battery, through wireless communication, to actuate the switching element,
wherein all battery cells of the battery have the at least one switching element and the switching elements of the all battery cells are closed by the command at the same time after connecting the electrical connection terminals of the all the battery cells, and
wherein the switching elements of the all battery cells are opened before connecting the electrical connection terminals of all the battery cells so that the galvanic element of each of the plurality of battery cells is isolated from a user of the battery,
wherein at least one of the control unit and the higher-level control device sends the command to open the at least one switching element of at least one predetermined battery cell of the plurality of battery cells during a servicing work of the user, and
wherein the higher-level control device sends the command to open the switching elements of the all battery cells when a predetermined accident occurs.

2. The method according to claim 1, wherein the at least two battery cells are switched in series by closing the at least one switching element.

3. The method according to claim 1, wherein the control unit communicates to the higher-level control device when the switching element has been brought into the switching state in which the electrically conducting connection is produced and which voltage the battery cell provides.

4. The method according to claim 1, wherein a plurality of battery cells is grouped together to form a battery module, wherein module connection terminals of at least two battery modules are connected by means of an electrically conductive module connector, and wherein, after this, at least one switching element of one of the battery cells of the particular battery module is brought into the switching state in which the electrically conducting connection is produced.

5. The method according to claim 1, wherein the switching element in the battery of at least the battery cell by which respective battery cell groupings of series-connected battery cells are interconnected in an electrically conducting manner is closed.

* * * * *